United States Patent
Gotoh et al.

[19]

[11] Patent Number: 6,141,963
[45] Date of Patent: Nov. 7, 2000

[54] MASTER CYLINDER

[75] Inventors: Hiroya Gotoh; Riichirou Sugimoto, both of Higashimatsuyama, Japan

[73] Assignee: Jidosha Kiki Co., Ltd., Japan

[21] Appl. No.: 09/258,926

[22] Filed: Mar. 1, 1999

[30] Foreign Application Priority Data

Mar. 25, 1998 [JP] Japan .................................. 10-076896

[51] Int. Cl.$^7$ ................................................. B60T 11/20
[52] U.S. Cl. .............................................. 60/562; 60/591
[58] Field of Search ............................ 60/562, 586, 587, 60/591, 592

[56] References Cited

U.S. PATENT DOCUMENTS 5,438,833   8/1995  Ishihara ...................... 60/562

*Primary Examiner*—Edward K. Look
*Assistant Examiner*—Thomas E. Lazo
*Attorney, Agent, or Firm*—Henry D. Coleman; R. Neil Sudol

[57] ABSTRACT

There is provided a master cylinder in which a large quantity of working fluid can be supplied rapidly, the air bleeding takes less time in the manufacturing process, and satisfactory performance can be provided when traction control is operated. For the master cylinder MC, a first supply passage 19 for supplying a working fluid from a working fluid reservoir to a pressure chamber 9 through a working fluid supply port 20a, supply passages 22, 23 and 24, and a working fluid supply port 5b formed in a piston 5, a second supply passage 50 is formed in parallel with the first supply passage directly between the working fluid supply port 20a and the pressure chamber 9, and a check valve 51 is disposed in the second supply passage 50. When the pressure in the pressure chamber 9 is lower than the pressure of the working fluid reservoir, the check valve 51 is opened, thereby allowing the working fluid to flow to the pressure chamber 9, and when the pressure in the first pressure chamber 9 is higher than the pressure of the working fluid reservoir, the check valve 51 is closed, thereby inhibiting the flow of the working fluid from the pressure chamber 9 to the working fluid reservoir.

3 Claims, 4 Drawing Sheets

F I G. 2 (a)
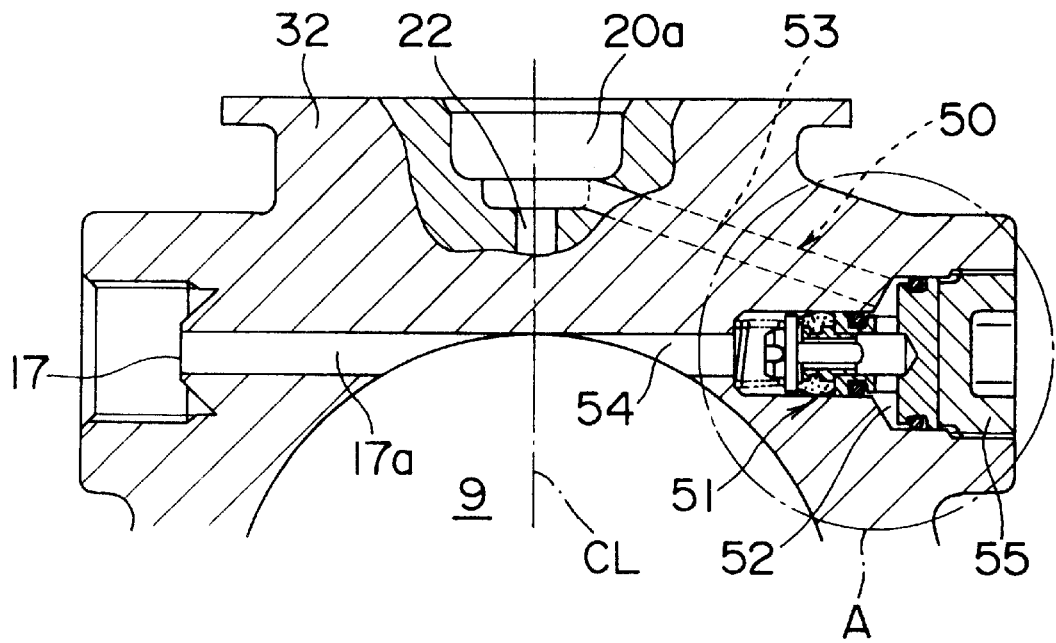
F I G. 2 (b)
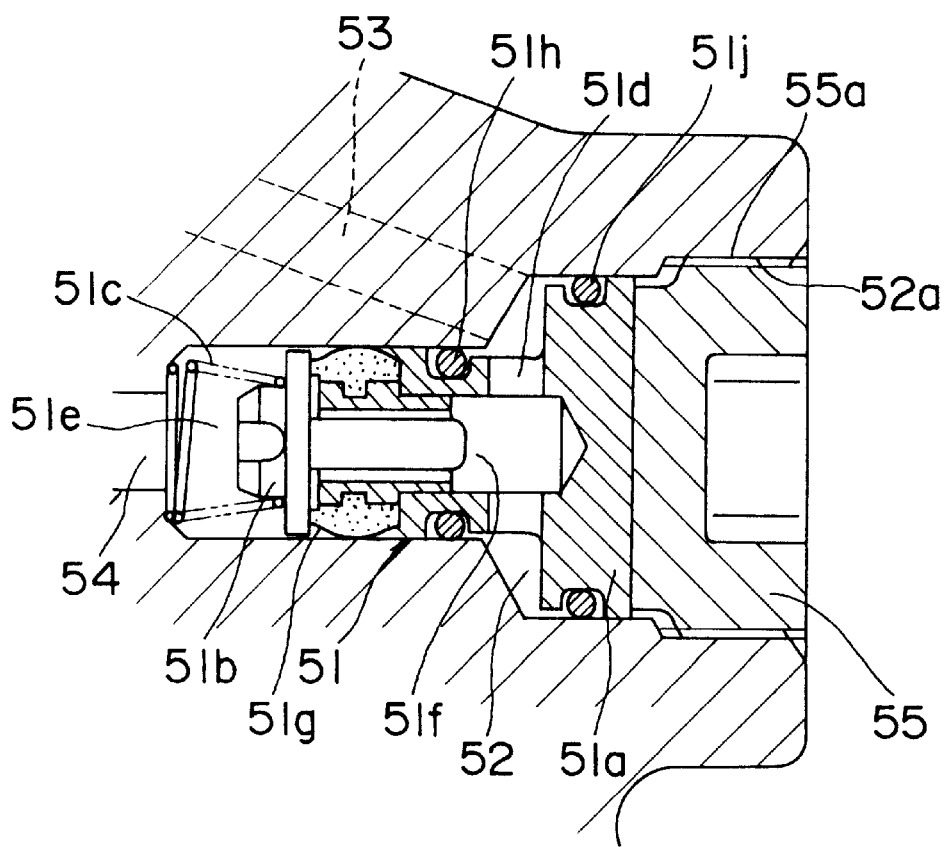

MASTER CYLINDER

FIELD OF THE INVENTION AND RELATED ART STATEMENT

The present invention relates to an improvement in a master cylinder used for various types of automotive brake systems.

Conventionally, as a master cylinder of this type, a tandem master cylinder MC, for example, as shown in FIG. 5 has been used, which is mounted in front of a brake booster (not shown). For this master cylinder MC, a cylinder housing 1 comprises a body 2 having an opening at one end thereof and a cap 3 screwed in the opening of the body 2.

In this cylinder housing 1 is fitted a sleeve 4 for positioning, made of a resin material. A primary piston 5 and a secondary piston 6 are inserted in the cap 3, and disposed slidably so as to be guided and supported by a piston guide portion 3a formed in the cap 3, another piston guide 7 made of a resin material, and the sleeve 4.

In the cylinder housing 1, a first pressure chamber 9 is defined by the primary piston 5, secondary piston 6, and cap 3, and a second pressure chamber 10 is defined by the secondary piston 6 and the inside wall surface of the body 2.

The primary piston 5 and secondary piston 6 are formed with recesses 5a and 6a, respectively, whose tip end side is open.

The peripheral walls forming the recesses 5a and 6a are provided with small holes 5b and 6b, respectively, as working fluid supply ports. Thereby, a supply passage (first supply passage) from a working fluid reservoir 21 to the first and second pressure chambers 9 and 10 is formed together with working fluid supply passages 22, 23, 24, 25 and 26 formed in the cap 3 and the body 2, at the brake release position.

The first and second pressure chambers 9 and 10 are provided with spring mechanisms 11 and 12, respectively, each having a return spring. The spring mechanisms 11 and 12, which are disposed between the recess 5a of the primary piston 5 and the secondary piston 6 and between the recess 6a of the secondary piston 6 and the inside wall surface of the body 2, respectively, urge the primary piston 5 and the secondary piston 6 in the retreat direction, respectively.

A seal member 15 is disposed on the side surface of the piston guide portion 3a of the cap 3 on the side of the first pressure chamber 9. When the brake is suddenly released, the seal member is deformed by a negative pressure in the first pressure chamber 9, by which a working fluid is rapidly supplied from the working fluid reservoir 21 through a bypass passage 27 provided in the piston guide portion 3a. Similarly, when the brake is released, a seal member 16 disposed on the side surface of the piston guide 7 on the side of the second pressure chamber 10 is deformed by a negative pressure in the second pressure chamber 10, by which the working fluid is rapidly supplied from the working fluid reservoir 21 through a bypass passage 28 provided in the piston guide 7.

In the master cylinder MC thus constructed, when the primary piston 5 and the secondary piston 6 are pushed into the first and second pressure chambers 9 and 10 in the left direction in the figure against the urging forces of the spring mechanisms 11 and 12, respectively, and the small holes 5b and 6b formed in the pistons 5 and 6 pass through the seal members 15 and 16 disposed in the pressure chambers 9 and 10, respectively, the fluid pressures in the pressure chambers 9 and 10 are increased, so that the seal members 15 and 16 are pressed on the piston guide portion 3a and the piston guide 7, respectively, whereby seal is provided. Therefore, the fluid pressures in the pressure chambers 9 and 10 are further increased, so that the working fluid is sent under pressure to a brake system (not shown) through delivery ports 17 and 18.

In the manufacturing process for the master cylinder MC at a factory, air bleeding of the pressure chambers 9 and 10 and the working fluid supply passage system is necessary for the purpose of filling the master cylinder MC with the working fluid or for other purposes.

However, in the conventional master cylinder MC (especially in the small-size master cylinder), the supply passages 21, . . . , 26 leading to the small holes 5b and 6b in the pistons 5 and 6, which are provided to supply the working fluid from the working fluid reservoir 21 to the pressure chambers 9 and 10, each have a restricted portion (not shown) in the halfway position thereof, so that when a large quantity of working fluid must be supplied, it cannot be supplied rapidly.

Also, since the supply passage system leading to the primary piston 5 is especially thin and long, the air bleeding in the manufacturing process at the factory requires much time. Especially when traction control is operated, satisfactory performance cannot be provided.

The present invention has been made in view of the above situation, and accordingly an object thereof is to provide a master cylinder that solves the above problems, and can supply a large quantity of working fluid rapidly to the pressure chambers when needed.

Another object of the present invention is to provide a master cylinder in which the air bleeding takes less time in the manufacturing process at the factory, and especially when traction control is operated, satisfactory performance can be provided.

OBJECT AND SUMMARY OF THE INVENTION

To achieve the above objects, the present invention provides a master cylinder comprising a cylinder housing consisting of a body having an opening at one end and a cap joined to the opening of the body, a sleeve fitted in the cylinder housing, a piston inserted in the cap and slidably provided so as to be guided by the sleeve and a piston guide, and a pressure chamber defined by the piston and the cylinder housing.

In this master cylinder, in parallel with a first supply passage formed in the piston guide etc. of the cylinder housing to supply a working fluid from an outside working fluid supply source, for example, a working fluid reservoir to the pressure chamber through a working fluid supply port (small hole) formed in the piston at the brake release position, a second supply passage is formed directly between the working fluid reservoir and the pressure chamber, and a check valve is disposed in the second supply passage.

When the pressure in the pressure chamber is lower than the pressure of the working fluid reservoir, especially when a negative pressure is produced, the check valve is opened, thereby allowing the working fluid to flow to the pressure chamber, and when the pressure in the pressure chamber is higher than the pressure of the working fluid reservoir, the check valve is closed, thereby inhibiting the flow of the working fluid from the pressure chamber to the working fluid reservoir.

The master cylinder is characterized in that the second supply passage is formed in the body of the cylinder housing.

Also, the master cylinder is characterized in that the second supply passage consists of a supply passage member, for example, a hose or a pipe connected to the outside supply port of the working fluid reservoir and a supply passage connected to the supply passage member and formed in the body of the cylinder housing.

As it is apparent from the above description, according to the master cylinder in accordance with the present invention, the first supply passage formed in the piston guide etc. to supply a working fluid from the outside working fluid supply source to the pressure chamber through the working fluid supply port formed in the piston, a second supply passage provided with the check valve therein is formed in parallel with the first supply passage directly between the working fluid supply source and the pressure chamber, and when the pressure in the pressure chamber is lower than the pressure of the working fluid supply source, the check valve is opened, thereby allowing the working fluid to flow to the pressure chamber, and when the pressure in the pressure chamber is higher than the pressure of the working fluid supply source, the check valve is closed, thereby inhibiting the flow of the working fluid from the pressure chamber to the working fluid supply source. Therefore, a large quantity of working fluid can be supplied rapidly to the pressure chamber when needed.

At the same time, the air bleeding takes less time in the manufacturing process at the factory, and especially when traction control is operated, working fluid can be supplied smoothly and satisfactory performance can be provided.

For this reason, the assembling manpower including adjusting manpower can be reduced in the manufacturing process.

Also, even when a large quantity of working fluid must be supplied rapidly to the pressure chambers 9 and 10, for example, in the case of double depression of a brake pedal such that after the brake is applied, the brake is released suddenly and further the brake is applied suddenly, a large quantity of working fluid can be supplied rapidly to the pressure chambers.

BRIEF DESCRIPTION OF THE DRAWINGS

FIG. 2(*a*) is a sectional view of a principal portion taken along the line II—II of FIG. 1, including a cross section of a working fluid supply port, and FIG. 2(*b*) is an enlarged view of portion A of FIG. 2(*a*);

DETAILED DESCRIPTION OF PREFERRED EMBODIMENTS

Preferred embodiments of the present invention will be described in detail with reference to the accompanying drawings.

For this master cylinder, a cylinder housing is constructed by joining a cap to a body, and a first supply passage is formed in a piston guide etc. of the cylinder housing to supply a working fluid from a working fluid reservoir (working fluid supply source) installed on the outside to a pressure chamber through a small hole (working fluid supply port) formed in a piston sliding in the cylinder housing at the brake release position of the master cylinder, a second supply passage is formed in parallel with directly between the working reservoir and the pressure chamber in the body of the cylinder housing (first embodiment), or in a supply passage member such as hose or pipe and the body of the cylinder housing connected to the supply passage member (second embodiment).

A check valve is disposed in the second supply passage. When the pressure in the pressure chamber becomes lower than the pressure of the working fluid reservoir, the check valve is opened, thereby allowing the working fluid to flow directly to the pressure chamber. When the pressure in the pressure chamber becomes higher than the pressure of the working fluid reservoir, the check valve is closed, thereby inhibiting the flow of the working fluid from the pressure chamber to the working fluid reservoir.

(First embodiment)

Figure 1:
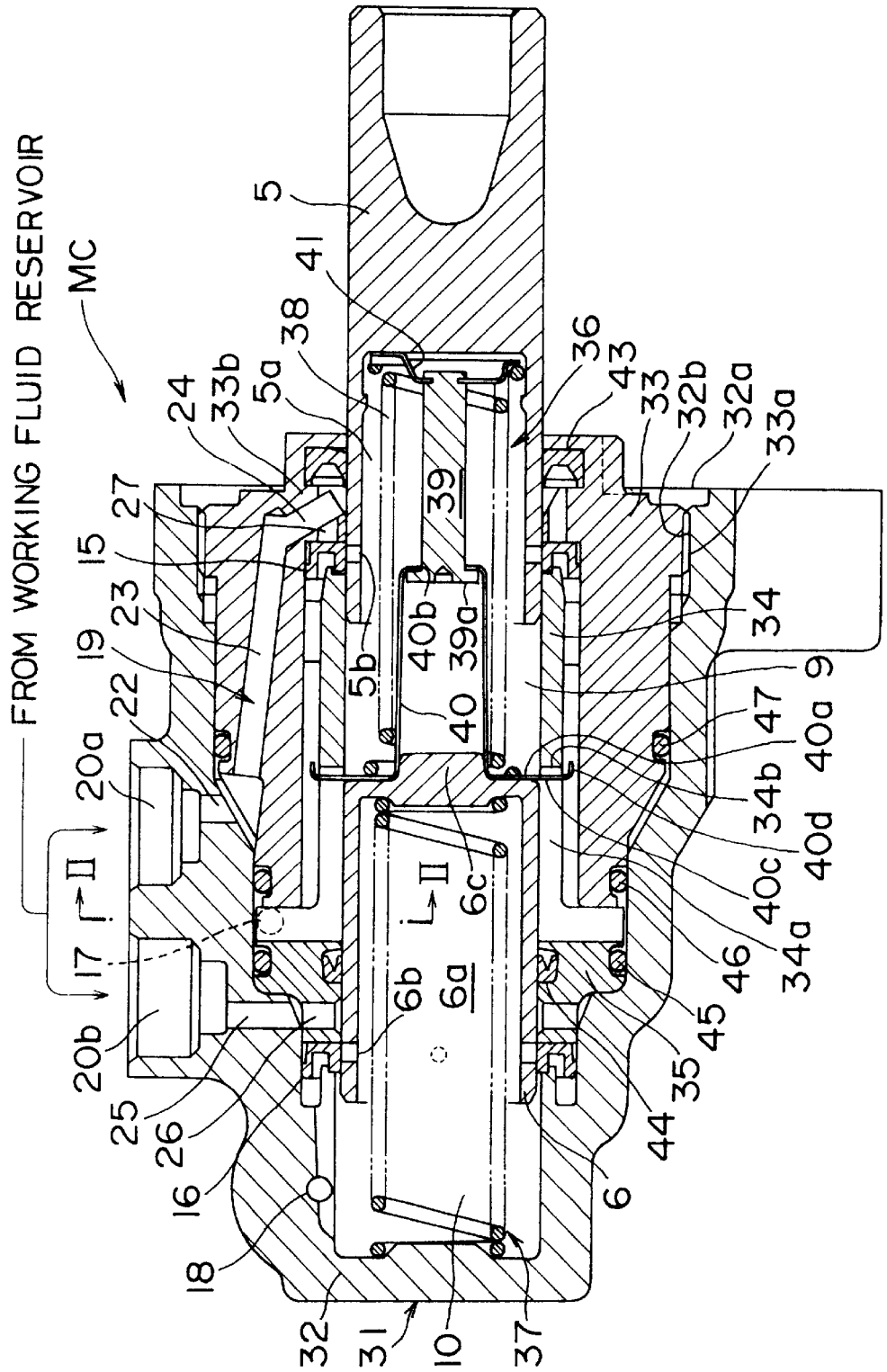
FIG. 1, along with FIG. 2, is a longitudinal sectional view showing a first embodiment of a master cylinder in accordance with the present invention.
Figure 5:
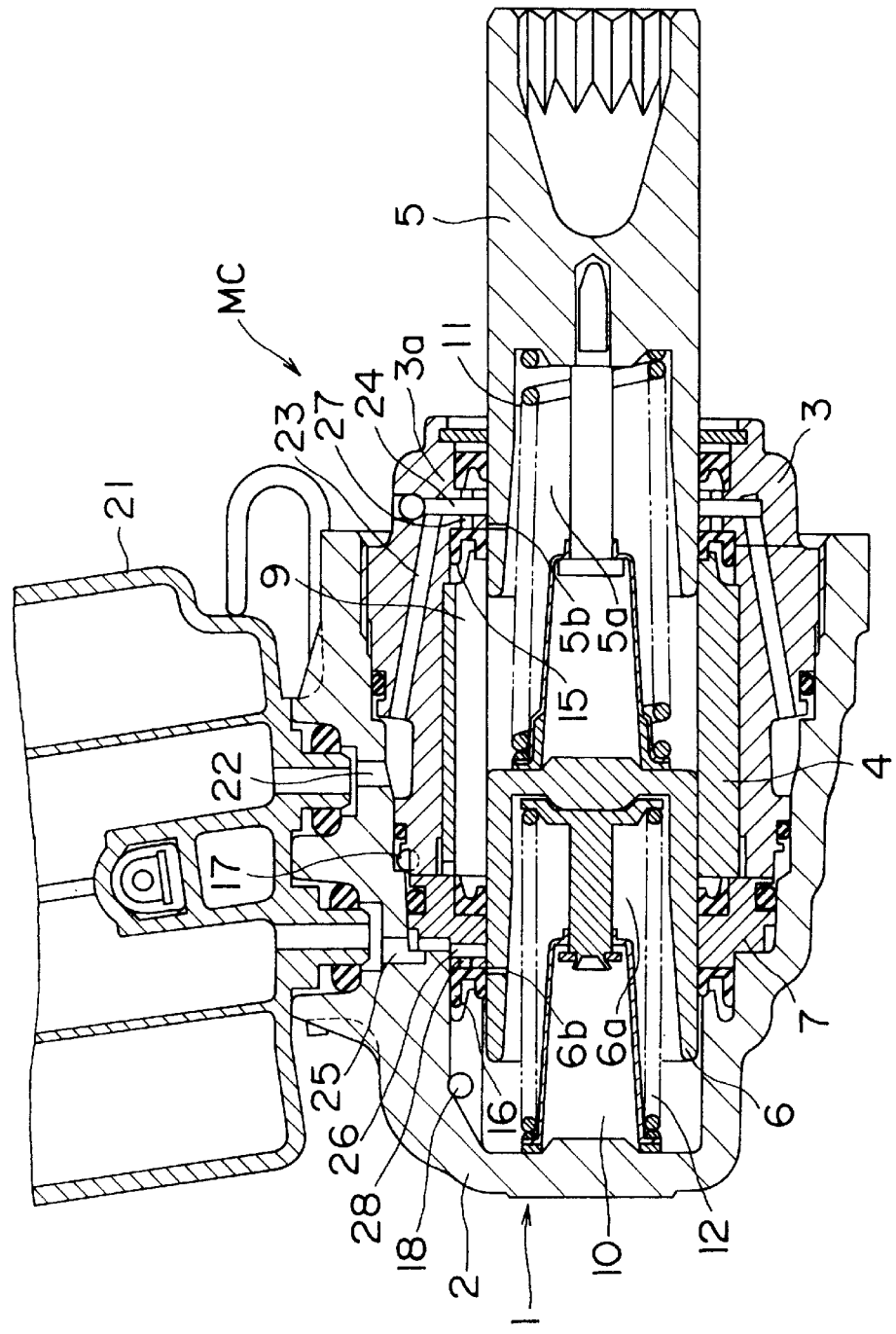
FIG. 5 is a longitudinal sectional view of a master cylinder relating to the present invention.

FIGS. 1 and 2 show a first embodiment of a master cylinder of the present invention. FIG. 1 is a longitudinal sectional view of the master cylinder MC, FIG. 2(*a*) is a sectional view of a principal portion taken along the line II—II of FIG. 1, including a cross section of a working fluid supply port, and FIG. 2(*b*) is an enlarged view of portion A of FIG. 2(*a*). In these figures, the same reference numerals are applied to the same elements as those in FIG. 5, and the explanation of these elements is omitted.

Referring now to FIGS. 1 and 2(*a*), a cylinder housing 31 of the master cylinder MC comprises a body 32 having an opening 32*a* at one end thereof and a cap 33 screwed in the opening 32*a* of the body 32 by using external threads 33*a* formed on the cap 33 and internal threads 32*b* formed on the side of the opening 32*a* of the body 32.

When the cap 33 is joined to the body 32 by screwing the external threads 33*a* into the internal threads 32*b*, the cap 33 is assembled to the body 33 while the supply passage 23 communicating with a working fluid supply port 20*a* from the working fluid reservoir 21 (not shown) is positioned on the upside (the side on which the working fluid supply port 20*a* is disposed) of the master cylinder MC.

In this cylinder housing 31 is fitted a sleeve 34 made of a resin material. The primary piston 5 and the secondary piston 6 are inserted in the cap 33, and disposed slidably so as to be guided and supported by a piston guide portion 33*b* formed in the cap 33, a piston guide 35 made of a resin material, which is disposed in the body 32, and the sleeve 34.

The cap 33 including the piston guide portion 33*b* has the supply passages 23 and 24 communicating with the supply passage 22 formed in the body 32 from the working fluid supply port 20*a*, and the piston guide 35 has the supply passages 25 and 26 communicating with a working fluid supply port 20*b* from the working fluid reservoir 21 (not shown).

In the cylinder housing 31, the first and second pressure chambers 9 and 10 are defined like the conventional master cylinder MC. The first and second pressure chambers 9 and 10 are provided with spring mechanisms 36 and 37, which urge the primary piston 5 and the secondary piston 6 in the retreat direction, respectively.

The spring mechanism 36 is made up of a return spring 38, a guide pin 39 having a large head portion 39*a*, a spring retainer 40 of a derby hat shape (or a flanged cylindrical shape), and a guide pin fixing member 41. The return spring 38 is provided between the peripheral portion of the guide pin fixing member 41 and the peripheral portion 40a of the spring retainer 40 so as to be compressed. One end of the return spring 38 is fitted in the expanded diameter portion formed on the bottom surface of the recess 5a of the primary piston 5. The guide pin 39 is disposed so as to separate from the bottom surface of the recess 5a by a predetermined distance and project in the piston axis direction. The fixing member 41 is fixed into a fixing groove formed in the end portion of the guide pin 39.

For the spring retainer 40, the inner peripheral surface thereof is fitted on the outer peripheral surface of a columnar protrusion 6c formed on the rear end surface of the secondary piston 6, and a hole 40b formed in the head portion of the derby hat shape slides freely on the guide pin 39 in the range of predetermined stroke (the range slightly beyond the retreat limit of the primary piston 5) and engages with the large head portion 39a of the guide pin 39.

The spring mechanism 37 consists of a return spring only.

Here, for the spring retainer 40 of the spring mechanism 36, the peripheral portion 40a thereof is integrally formed with a plurality of (for example, four) projecting portions 40c projecting outward in the radial direction, and hook portions 40d are formed by folding the tip ends of the projecting portions 40c in the piston axis direction to the side of the spring retainer 40 so as to be hooked on the outer peripheral surface of the sleeve 34.

Thereupon, even if an excessive drawing force is applied to the primary piston 5, the hook portion 40d is caught by the outer peripheral surface of the sleeve 34, and the spring retainer 40 is not deformed, so that the primary piston 5 does not easily come off.

The sleeve 34 is formed with a plurality of penetrating wide guide grooves 34a with a fixed width on the outer peripheral surface in the axial direction in which the projecting portion 40c and hook portion 40d are inserted and engage with each other. The guide groove 34a is formed with a fixing portion 34b, which the projecting portion 40c is caused to abut on and fixed to, at a position slightly beyond the retreat limit of the primary piston 5 from the end of the sleeve 34.

Annular seal members 15, 16 (these have been mentioned before), 43, 44, 45, 46 and 47 are disposed at places shown in FIG. 1 in the cylinder housing 31.

A second supply passage 50 is formed in the body 32 in parallel with the first supply passage 19 leading from the working fluid supply port 20a to the first pressure chamber 9 through the supply passages 22, 23 and 24 and the small hole 5b serving as a working fluid supply port formed in the primary piston 5.

As shown in FIG. 2(a), the second supply passage 50 includes a check valve 51 disposed in a check valve chamber 52, and consists of a supply passage 53 for connecting the working fluid supply port 20a to the check valve chamber 52 and a supply passage 54 for connecting the check valve chamber 52 to the first pressure chamber 9.

The check valve chamber 52 is provided in the body 32 on the opposite side to the working fluid delivery port 17 of the first pressure chamber 9 with respect to the vertical centerline CL of the master cylinder MC. The supply passage 54 is formed on substantially the same straight line as the passage 17a of the delivery port 17. The end portion of the check valve chamber 52 is formed with internal threads 52a on the inner peripheral surface thereof which is open to the outside.

As shown in FIG. 2(b), the check valve 51 includes a valve body 51a, a valve element 51b, and a spring 51c. The valve body 51a is provided with an inlet port 51d and a through hole 51f communicating with the inlet port 51d and an outlet port 51e. The valve element 51b is always urged toward the side of the inlet port 51d by the spring 51c so as to seated on valve seat 51g provided on the side of the inlet port 51d of the valve body 51a.

To mount the check valve 51 in the check valve chamber 52 by using a mounting plug 55, external threads 55a formed on the outer peripheral surface of the mounting plug 55 is screwed in the internal threads 52a formed on the inner peripheral surface at the end of the check valve chamber 52. Reference numerals 51h and 51j denote seal members.

In this case, the inlet port 51d of the check valve 51 communicates with the working fluid supply port 20a, and the outlet port 51e communicates with the first pressure chamber 9.

The check valve 51 thus constructed is opened when the pressure in the first pressure chamber 9 is lower than the pressure of the working fluid reservoir 21 connected to the working fluid supply port 20a, thereby allowing the working fluid to flow from the working fluid reservoir 21 to the first pressure chamber 9. The check valve 51 is closed when the pressure in the first pressure chamber 9 is higher than the pressure of the working fluid reservoir 21, thereby inhibiting the flow of the working fluid from the pressure chamber 9 to the working fluid reservoir 21.

Therefore, according to the master cylinder MC of this embodiment, a large quantity of working fluid can be supplied rapidly to the first pressure chamber 9.

Although the case where the second supply passage 50 is disposed between the working fluid supply port 20a and the first pressure chamber 9 has been described above, a similar second supply passage can be disposed between the working fluid supply port 20b and the second pressure chamber 10.

Also, since the pistons 5 and 6 do not slide on the inner peripheral surfaces of the first and second pressure chambers 9 and 10 in this embodiment, the respective supply passages 54 leading from the respective check valve chambers 52 to the first and second pressure chambers 9 and 10 can be opened at an arbitrary position in the axial direction of the first and second pressure chambers 9 and 10.

(Second embodiment)

Figure 3:
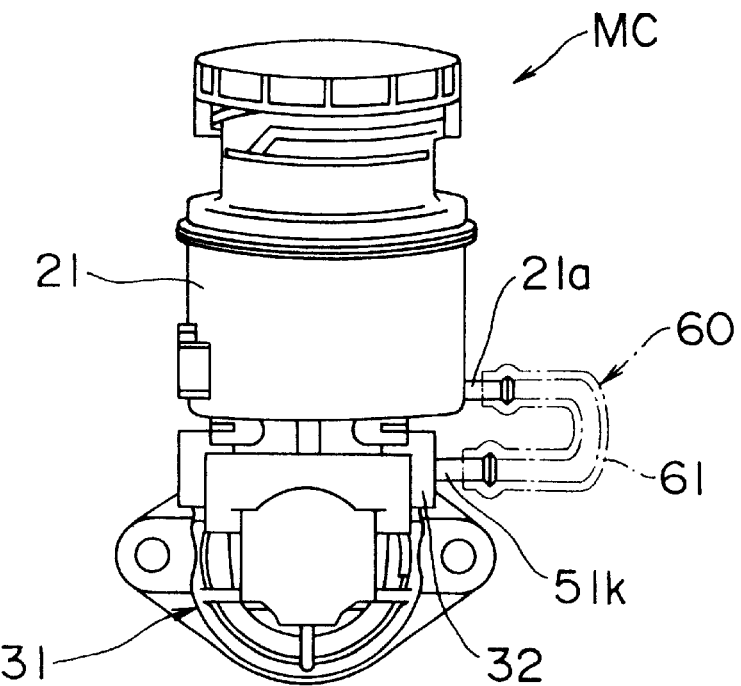
FIG. 3 is an outside view showing a connection between a working fluid reservoir and a first pressure chamber in a cylinder housing by means of a supply passage member on the outside, showing a second embodiment of the present invention along with FIGS. 1 and 4.
Figure 4:
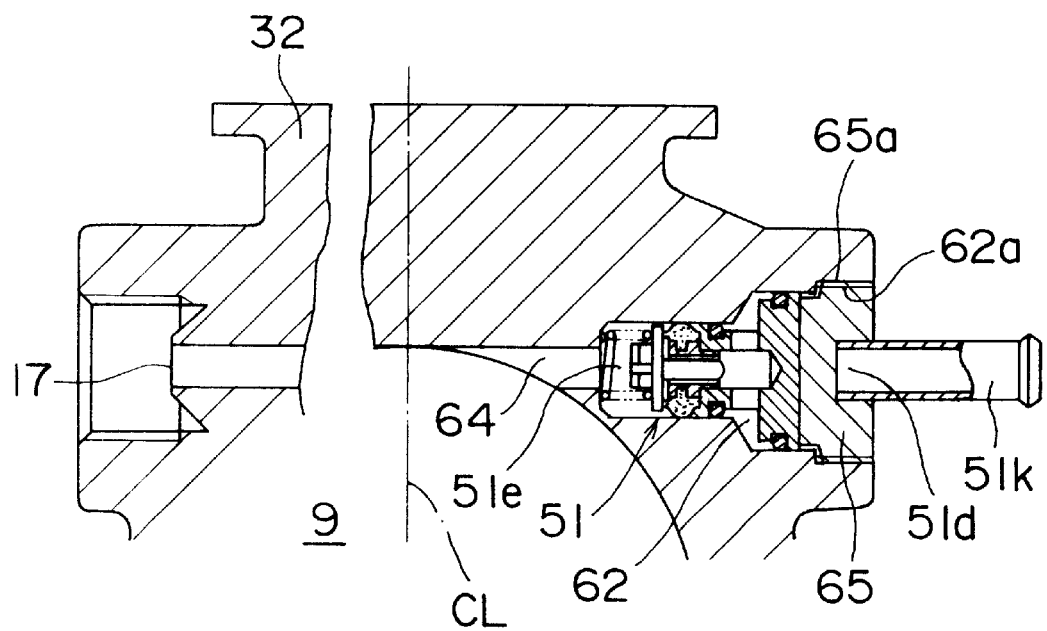
FIG. 4 is a sectional view of a supply passage which communicate with the first pressure chamber in the cylinder housing and is provided with a check valve therein, corresponding to FIG. 2(*a*)

FIGS. 3 and 4 show a second embodiment of a master cylinder in accordance with the present invention, along with FIG. 1. FIG. 1 is a longitudinal sectional view of the master cylinder MC, FIG. 3 is an outside view showing a connection between the working fluid reservoir and the first pressure chamber in the cylinder housing by means of a supply passage member (for example, a supply hose) on the outside, and FIG. 4 is a sectional view of a supply passage which communicate with the first pressure chamber in the cylinder housing and is provided with the check valve therein, corresponding to FIG. 2(a). FIG. 1 is as described in the aforementioned first embodiment, and the explanation thereof is omitted.

A second supply passage 60 is formed in the body 32 of the cylinder housing 31 so as to include a supply hose (alternatively, a supply pipe may be used) 61 connected on the outside, in parallel with the first supply passage 19 leading from the working fluid supply port 20a to the first pressure chamber 9 through the supply passages 22, 23 and 24 and the small hole 5b serving as a working fluid supply port formed in the primary piston 5.

As shown in FIG. 3, the second supply passage 60 includes the supply hose 61 one end of which is connected to an outside supply port 21*a* of the working fluid reservoir 21 and the other end of which is connected to a check valve chamber 62 formed in the body 32 on the outside, and the check valve 51 disposed in the check valve chamber 62, and consists of the supply passage 64 leading from the check valve chamber 62 to the first pressure chamber 9. The other end of the supply hose 61 communicates via a connection port 51*k* of the check valve 51.

The check valve chamber 62 is provided in the body 32 on the opposite side to the working fluid delivery port 17 of the first pressure chamber 9 with respect to the vertical centerline CL of the master cylinder MC. The supply passage 64 is formed on substantially the same straight line as the passage 17*a* of the delivery port 17. The end portion of the check valve chamber 62 is formed with internal threads 62*a* on the inner peripheral surface thereof which is open to the outside.

To mount the check valve 51 in the check valve chamber 62 by using a mounting plug 65, external threads 65*a* formed on the outer peripheral surface of the mounting plug 65 is screwed in the internal threads 62*a* formed on the inner peripheral surface at the end of the check valve chamber 62.

In this case, the inlet port 51*d* of the check valve 51 communicates with the supply hose 61, and the outlet port 51*e* communicates with the first pressure chamber 9.

The check valve 51 thus constructed is opened when the pressure in the first pressure chamber 9 is lower than the pressure of the working fluid reservoir 21 communicating with the outside supply port 21*a*, thereby allowing the working fluid to flow from the working fluid reservoir 21 to the first pressure chamber 9. The check valve 51 is closed when the pressure in the first pressure chamber 9 is higher than the pressure of the working fluid reservoir 21, thereby inhibiting the flow of the working fluid from the first pressure chamber 9 to the working fluid reservoir 21.

Therefore, according to the master cylinder MC of this embodiment, a large quantity of working fluid can be supplied rapidly to the first pressure chamber 9.

Although the case where the second supply passage 60 is disposed between the outside supply port 21*a* of the working fluid reservoir 21 and the first pressure chamber 9 has been described above, a similar second supply passage can be disposed between another outside supply port of the working fluid reservoir 21 and the second pressure chamber 10. Further, in this embodiment, the check valve 51 may be installed in the supply hose 61 forming the second supply passage 60.

Also, like the aforementioned first embodiment, since the pistons 5 and 6 do not slide on the inner peripheral surfaces of the first and second pressure chambers 9 and 10 in this embodiment, the respective supply passages 64 leading from the respective check valve chambers 62 to the first and second pressure chambers 9 and 10 can be opened at an arbitrary position in the axial direction of the first and second pressure chambers 9 and 10.

The art of the present invention is not limited to the art in the above-described embodiments, and the means of other modes capable of performing a similar function may be used. Also, the art of the present invention can be modified and added variously without departing from the spirit and scope of the invention.

According to the master cylinder MC in the above-described embodiments, the air bleeding property in a plunger type master cylinder construction can also be improved.

What is claimed is:

1. A master cylinder comprising: a cylinder housing consisting of a body having an opening at one end and a cap joined to the opening of said body; a sleeve fitted in said cylinder housing; a piston inserted in said cap and slidably provided so as to be guided by said sleeve and a piston guide; and a pressure chamber defined by said piston and said cylinder housing, wherein a first supply passage is formed in said cylinder housing to supply a working fluid from an outside working fluid supply source to said pressure chamber through a working fluid supply port formed in said piston, a second supply passage is formed in parallel with the first supply passage directly between said working fluid supply source and said pressure chamber, and a check valve is disposed in said second supply passage, and when the pressure in said pressure chamber is lower than the pressure of said working fluid supply source, said check valve is opened, thereby allowing the working fluid to flow to said pressure chamber, and when the pressure in said pressure chamber is higher than the pressure of said working fluid supply source, said check valve is closed, thereby inhibiting the flow of the working fluid from said pressure chamber to said working fluid supply source.

2. A master cylinder according to claim (1), wherein said second supply passage is formed in the body of said cylinder housing.

3. A master cylinder according to claim (1), wherein said second supply passage consists of a supply passage member connected to the outside supply port of said working fluid supply source and a supply passage connected to said supply passage member and formed in the body of said cylinder housing.

* * * * *